Fields & Townsend
Tanning Leather.
No. 1,849. Reissued Jan. 10, 1865.
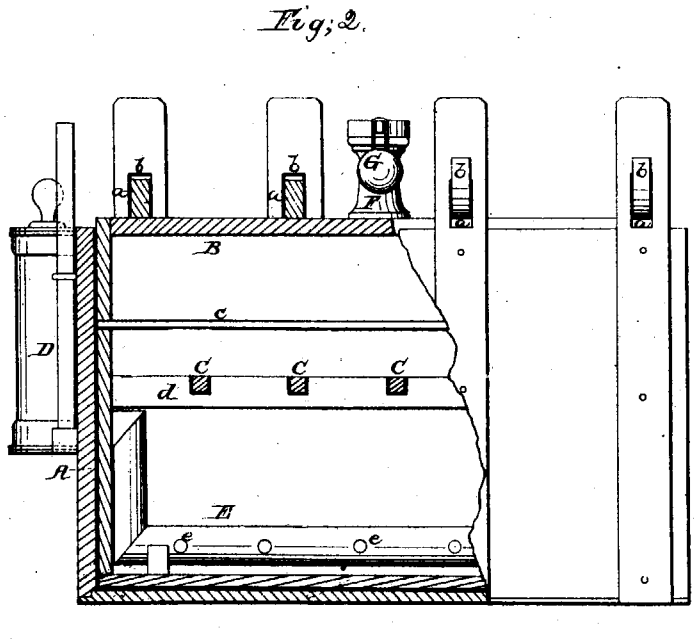
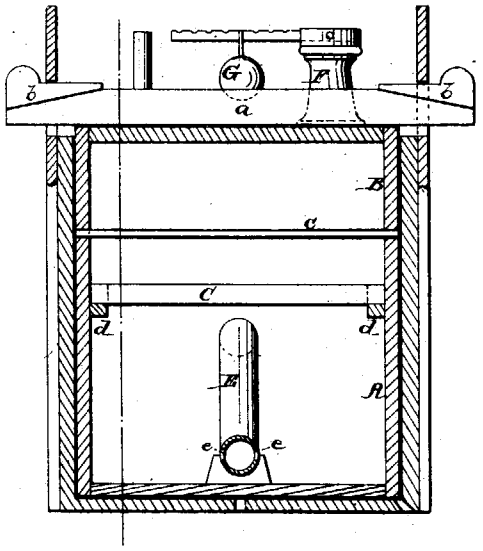
Witnesses;
C. L. Topliff
Geo. W. Reed
Inventors;
William Fields
J. Townsend
per Munn & Co
Attorneys

UNITED STATES PATENT OFFICE.

SIMON H. KENNEDY AND HENRY L. ELDER, OF PHILADELPHIA, PENNSYLVANIA, ASSIGNEES OF WILLIAM FIELDS AND ISRAEL TOWNSEND.

IMPROVEMENT IN TANNING HIDES AND SKINS.

Specification forming part of Letters Patent No. 43,013, dated June 7, 1864; Reissue No. 1,849, dated January 10, 1865.

*To all whom it may concern:*

Be it known that WILLIAM FIELDS and ISRAEL TOWNSEND, both of Wilmington, in the county of Newcastle and State of Delaware, assignors to SIMON H. KENNEDY and HENRY L. ELDER, of Philadelphia, in the county of Philadelphia and State of Pennsylvania, have invented a new and useful Improvement in Tanning Hides and Skins, of which invention the following is a full, clear, and exact description, which will enable those skilled in the art to fully understand and use the same, reference being had to the accompanying drawings, making a part of this specification, in which—

Figure 1 is a transverse vertical section of an apparatus by means of which the said invention may be explained; Fig. 2, a side elevation of the same, partly in section.

Similar letters of reference indicate like parts.

This invention consists in the employment or use for the purpose of tanning hides or skins of a current of air applied to said hides or skins under a pressure of from five to twenty or more pounds, acting in combination with the ordinary or other tanning liquors in such a manner that the compressed air is caused to circulate through the liquid, and by its action the tanning-liquid is forced into the hides or skins, and at the same time by the motion of the air in the vat the hides are constantly brought in contact with fresh air, and the handling of the hides and all the labor connected therewith can be saved.

The invention consists, also, in the application of a perforated pipe extending through the tanning vat near its bottom, in combination with an air-tight vat, air-pump, and loaded valve in such a manner that air forced through the pipe into the vat will permeate the tanning-liquid therein, and will not be allowed to escape until it reaches a certain pressure, when the loaded valve opens, and by the nature of the pump a continuous current of compressed air is passed through the vat, whereby the operation of tanning is considerably facilitated.

A represents a tanning-vat, made of wood or any other suitable material, sufficiently strong and capable of resisting the action of the tanning-liquor which may be used. It is closed by a cover, B, which is held down by cross-bars *a* and wedges *b*, or in any other convenient manner, and which must be made so that it fits air-tight into the top of the vat. In order to effect this purpose the vat is provided in its interior with a rim, *c*, and a piece of packing placed between this rim and the lower edge of the cover renders the joint tight; but we do not wish to confine ourselves to this precise mode of securing the cover, as this operation can be effected in many different ways, and will necessarily be altered, according to the construction of the vat.

The hides or skins to be tanned are suspended from a series of cross-bars, C, which are supported by notched rails *d*, secured to the interior of the vat, one opposite the other, as clearly shown in Fig. 1 of the drawings.

D is an air-pump, which is secured to one end of the vat A, and which communicates with a pipe, E, extending throughout the entire length of the vat and close down to its bottom, as shown in Fig. 2. This pipe is perforated with holes *e*, so that the air forced in by means of the air-pump will permeate the tanning-liquor contained in the vat, and by its action said tanning-liquor is caused to penetrate the hides or skins rapidly and thoroughly.

The compressed air alone, however, although it causes the tanning-liquor to penetrate the hides or skins, is not capable of doing away with the operation of handling such hides or skins, and the labor and time required to complete the operation of tanning is not materially reduced. In order to effect this purpose we have applied to the cover, or any other part of the vat above the water-line, a valve, F, which is loaded with an adjustable weight, G, so that it can be made to blow off with any desired pressure. This valve is set to a pressure of from five to twenty pounds to the square inch, and as soon as the pressure of the air in the interior of the vat reaches this point the valve opens and a continuous current of compressed air passes through the vat as long as the motion of the pump is not discontinued.

A suitable gage, H, applied to the side of the vat indicates the amount of pressure in the same, and by the continued action of the pump, perforated pipe, and loaded valve the hides or skins in the vat are exposed to the action of a continuous current of compressed air, so that the handling of the hides can be dispensed with and the operation of tanning is completed in a few days, and with much less labor than by the ordinary method of tanning in a compressed or open atmosphere.

Having thus described the said invention of the said WILLIAM FIELDS and ISRAEL TOWNSEND, the said SIMON H. KENNEDY and HENRY L. ELDER claim as new and original therein, and desire to secure by Letters Patent—

1. The employment or use in tanning hides or skins of a current of compressed air applied to the hides or skins, in combination with the ordinary or other tanning-liquors, in the manner and for the purpose substantially as specified.

2. The perforated pipe E, extending through the air-tight vat A near its bottom, in combination with an air-pump and loaded valve, all constructed and operating in the manner and for the purpose substantially as herein shown and described.

SIMON H. KENNEDY.
HENRY L. ELDER.

Witnesses:
HENRY T. RAY,
JOHN W. CARSON.